(12) United States Patent
Baskaran et al.

(10) Patent No.: US 9,111,160 B1
(45) Date of Patent: Aug. 18, 2015

(54) COMPUTER IMPLEMENTED NON-INTRUSIVE REMOTE MONITORING AND CAPTURING SYSTEM AND A METHOD THEREOF

(71) Applicant: TATA CONSULTANCY SERVICES LIMITED, Mumbai, Maharashtra (IN)

(72) Inventors: Manikandan Baskaran, Madurai (IN); Suresh Babu Ponnan, Chennai (IN); Madhava Raj Warrier, Palakkad District (IN); Ohm Kumar Balasubramanian, Chennai (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 0 days.

(21) Appl. No.: 14/496,454

(22) Filed: Sep. 25, 2014

(30) Foreign Application Priority Data

Jun. 25, 2014 (IN) .......................... 2045/MUM/2014

(51) Int. Cl.
*G06K 7/10* (2006.01)

(52) U.S. Cl.
CPC .................................. *G06K 7/10861* (2013.01)

(58) Field of Classification Search
CPC .......... G06K 7/10861; G06K 7/10851; G06K 17/00; G06K 7/10693; G06K 7/10722; G06K 7/1417
USPC ........................... 235/462.14, 462.13, 462.11
See application file for complete search history.

(56) References Cited

U.S. PATENT DOCUMENTS

| 1,027,639 | A1 | 11/2011 | Rathod |
| 2007/0248242 | A1 | 10/2007 | Ritter et al. |
| 2008/0177569 | A1 | 7/2008 | Chen et al. |

FOREIGN PATENT DOCUMENTS

| WO | WO-2008/030184 A1 | 3/2008 |
| WO | WO-2012/148934 A1 | 11/2012 |

*Primary Examiner* — Karl D Frech
(74) *Attorney, Agent, or Firm* — Fishman Stewart Yamaguchi PLLC

(57) ABSTRACT

The present disclosure envisages a computer implemented non-intrusive remote monitoring and capturing system for remotely monitoring operations on a plurality of workstations from an administrator. The system includes a first application installed on the workstations and a second application on the administrator. The first application executed on the workstations and the second executed on the administrator communicates with each other via a network. The first application of the workstation receives an electronic signal from a supervisor administering the administrator. The first application includes a first receiver having an extractor which is capable of extracting a first operation and a second operation command from the received electronic signal. Both the first operation command and the second operation command are embedded in a format selected from the group consisting of an email format, a short message service (SMS) format, a missed call format, a voice command format and a combination thereof within the electronic signal.

14 Claims, 5 Drawing Sheets

Figure 1A:
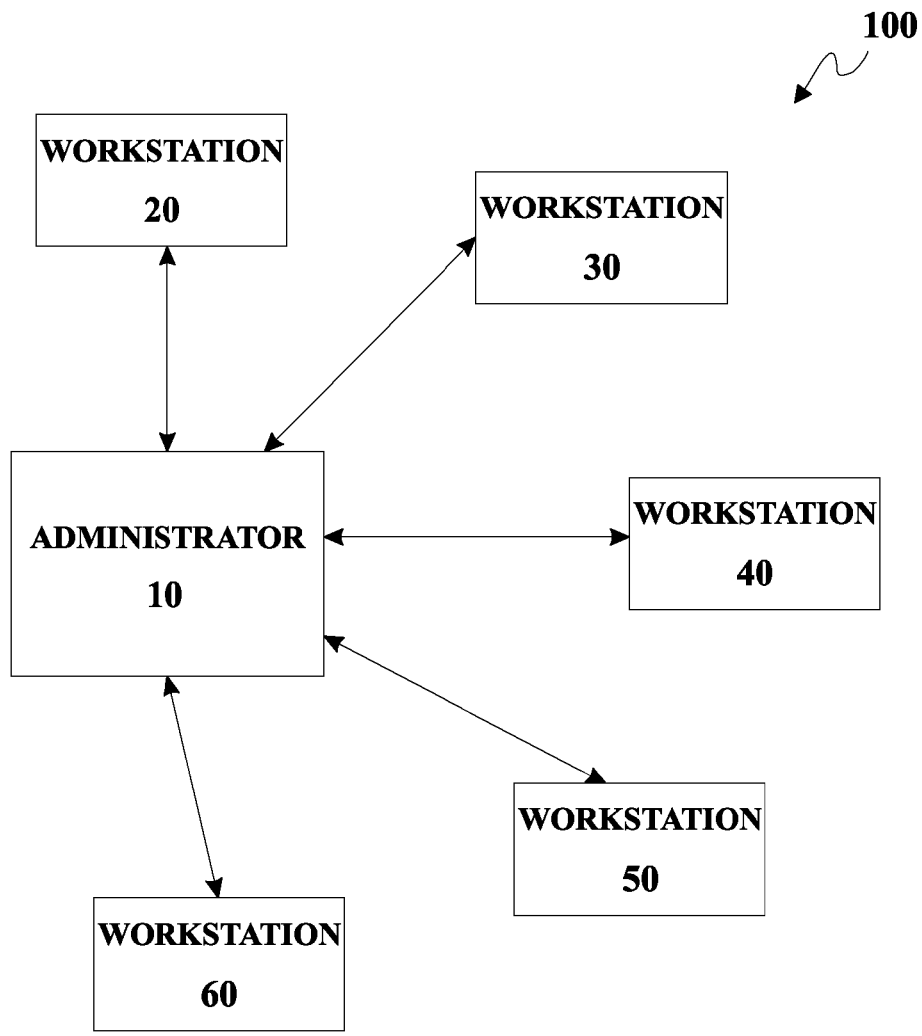

COMPUTER IMPLEMENTED NON-INTRUSIVE REMOTE MONITORING AND CAPTURING SYSTEM AND A METHOD THEREOF

FIELD OF THE DISCLOSURE

The present disclosure relates to the field of computer related software application used for monitoring.

DEFINITIONS OF TERMS USED IN THE SPECIFICATION

The expression 'workstations' used hereinafter in the specification refers to but is not limited to desktops, mobile phones, laptops, tablets, iPads, PDAs, notebooks, net books, terminals including wired or wireless computing devices.

The expression 'administrator' used hereinafter in the specification refers to bust is not limited to a computer server, a host, a computer, a computing machine, a computing device, a data processor, an electronic computer, and an information processing system.

The expression 'network' used hereinafter in the specification refers to a computer network, Internet, Intranet, a local area network (LAN), a wide area network (WAN), a metropolitan area network (MAN), a cellular network, a wired network, a wireless network and a combination thereof.

The expression 'digital footages' used hereinafter in the specification refers to but is not limited to documents, images, videos, audios, applications executed on a user's computer terminal, human interactions, key stroke actions performed by the user, mouse operations performed by the user, user navigation, other related user activities performed by user on his/her workstation and combination thereof.

The expression 'supervisor' used hereinafter in the specification refers to an administrator user. There can be an authorized user/sub-supervisor created or approved by the supervisor with user defined roles.

These definitions are in addition to those expressed in the art.

BACKGROUND

Workstation monitoring solutions are loaded into client workstations and servers. These monitoring solutions gather information regarding the applications and hardware operating at the client's location as well as supply activity reports to the concerned entity/body or the server to resolve any issues. In addition, screen-scraping capabilities are available to such monitoring solutions, allowing the concerned entity to view the screens that have been presented to the given user of that particular workstation.

However, the aforementioned monitoring solutions have their own limitations for example, if the supervisor or the authorized user is in transition and the monitoring solution is required to be initiated at the target workstation. In a second scenario if the nature of the work performed by the user of the target workstation demands travelling. Monitoring the workstation while in transit is a very difficult task to accomplish. This further includes a cost overhead either direct or hidden involved in the transition of the user.

The available computer monitoring solutions are not capable of automating the repeated tasks. Further, there are no computer solutions that can provide infrastructure to aggregate, consolidate and transport knowledge data. To accomplish the task of aggregation, consolidation and transferring knowledge data at go, the supervisor required to access multiple applications to do each tasks. This induces avoidable delays and produces disconnected flow in the captured digital footages. Additionally, the available computer solutions do not provide information for the purpose of complete knowledge transfer or for the purpose of imparting training to the new users.

Accordingly, there is a long felt need for a computerized system that will aim at providing a non-intrusive remote monitoring and capturing which will concentrate in improving the capturing process of desired digital footages. Further, there is a need for a solution that provides editing mechanism to edit the captured digital footages in a more presentable manner. Further, there is a need for the solution that involves a robust means for triggering the execution of the solution.

OBJECTS

Some of the objects of the present disclosure aimed to ameliorate one or more problems of the prior art or to at least provide a useful alternative are described herein below:

An object of the present disclosure is to provide a computer implemented system for the purpose of non-intrusive monitoring.

An object of the present disclosure is to provide a system that can be triggered by a missed call, email, short messaging service (SMS), and a voice command.

An object of the present disclosure is to provide a system that increases the work productivity of a user.

An object of the present disclosure is to provide a system that provides comprehensive reports based on the digital footages captured.

An object of the present disclosure is to provide a system that is enabled to capture activities performed by a user at his/her respective workstation.

An object of the present disclosure is to provide a system that facilitates users with multi-media editing functionalities.

An object of the present disclosure is to provide a system that enables the user to customizable automation of repeated task.

An object of the present disclosure is to provide a system that reduces manual efforts for creating training documentation.

An object of the present disclosure is to provide a system that can be managed with minimum administration.

An object of the preset disclosure is to provide a system that can produce documentation to be utilized for the training purpose.

SUMMARY

In an aspect of the present disclosure envisages a computer implemented non-intrusive remote monitoring and capturing system. The system is capable of monitoring and capturing operations on a plurality of workstations. This system includes two types of applications 1) a first application installed and executed on the plurality of workstations and 2) a second application installed and executed on the administrator. The administrator and the workstations involved with the non-intrusive monitoring system are accessible via a network. The first application installed in the workstation includes a first receiver that is enabled to receive an electronic signal from the supervisor who is authorized to access the administrator. Further, the first receiver processes the received electronic signal using an extractor. The extract extracts a first operation command and a second operation command from the electronic signal embedded in a format selected from the group consisting of an email format, a short message service (SMS) format, a missed call format, a voice command format and a combination thereof. The first receive includes a determinator that is enabled to determine whether the operation command related to activation or deactivation of an audio-video capturing device of the first application installed at the workstation for the purpose monitoring. If the operation command relates to activating the audio-video capturing device, then an acquiring module residing inside the audio-video capturing devices initiates the process of acquiring digital footages of the workstation. The digital footages acquired can include images, audios, videos and combinations thereof. The second operation command extracted by the extractor directs a first transmitter configured within the first application to transmit the acquired digital footages to the desired workstation or administrator.

BRIEF DESCRIPTION OF THE ACCOMPANYING DRAWINGS

Figure 1B:
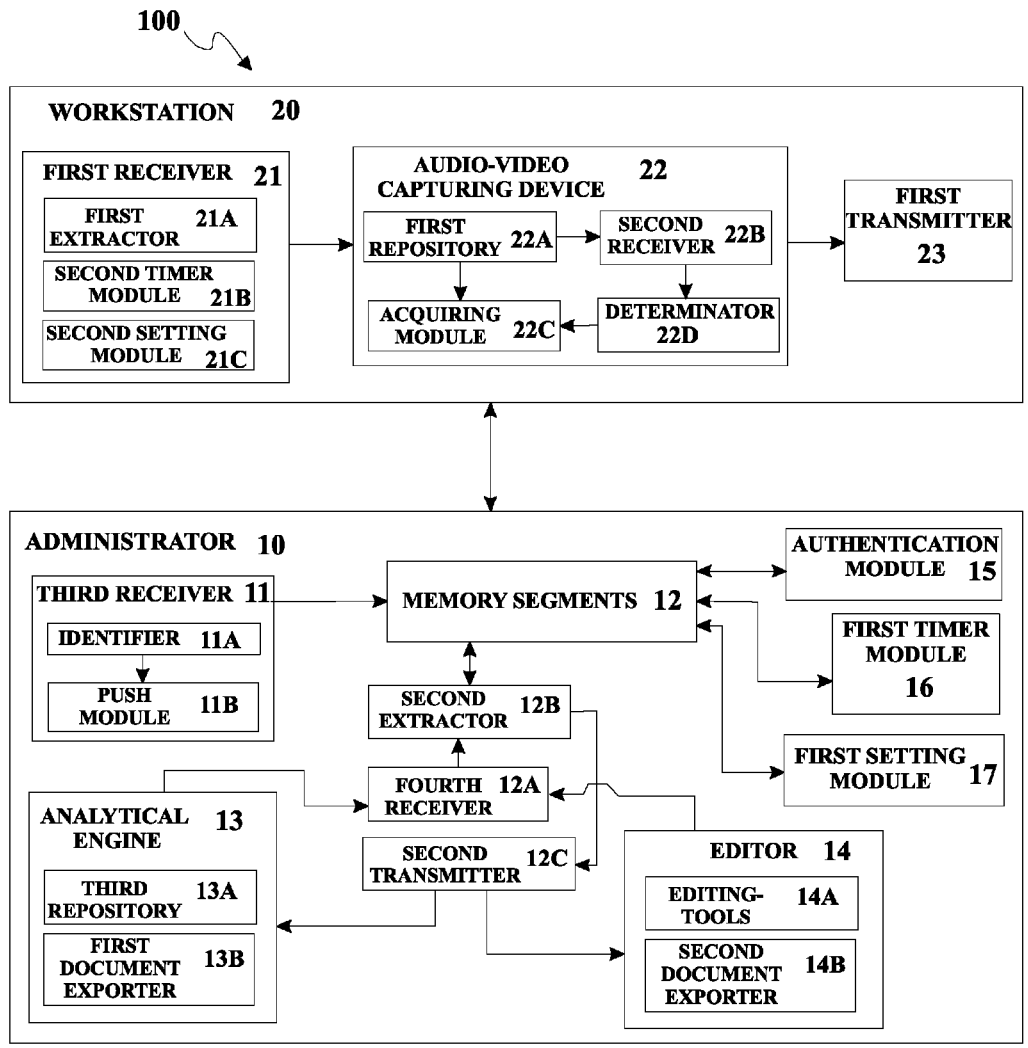
Figure 2:
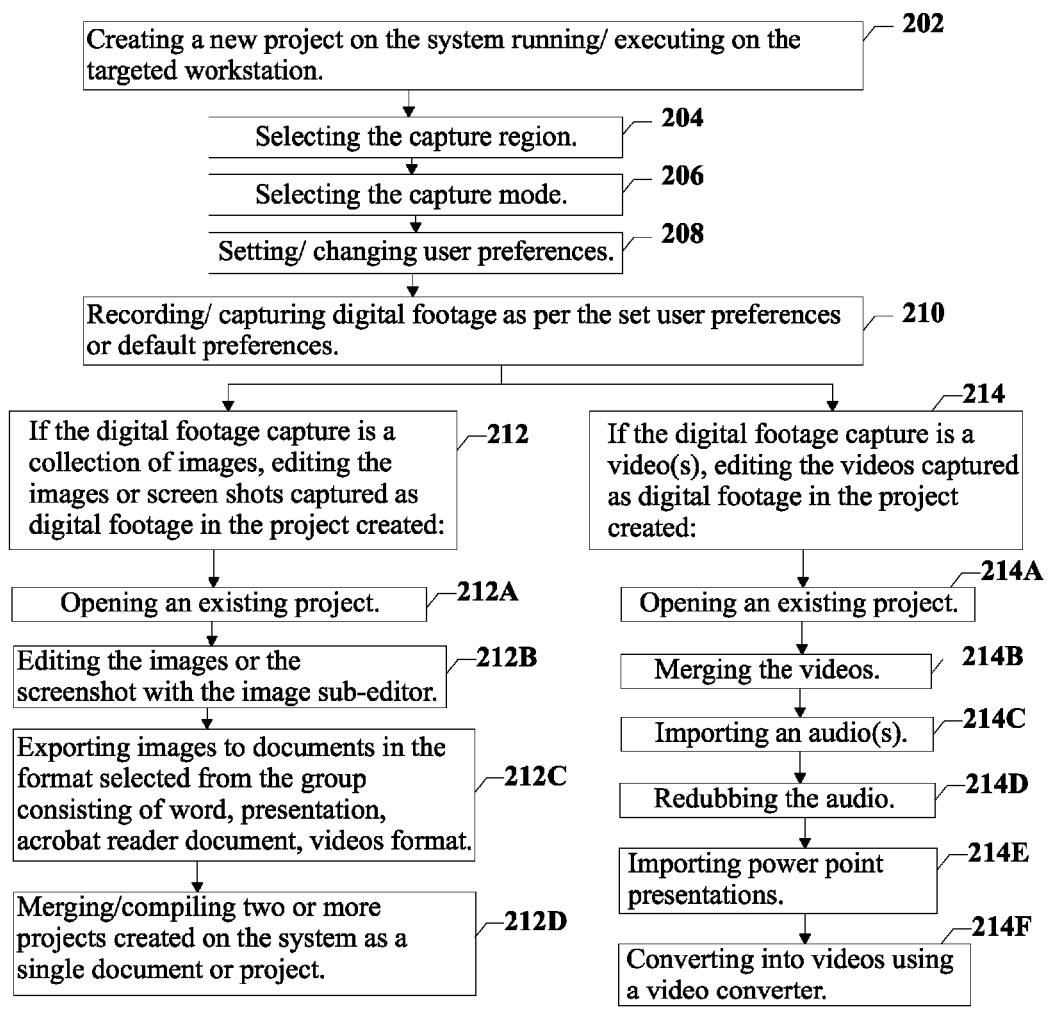
Figure 3A:
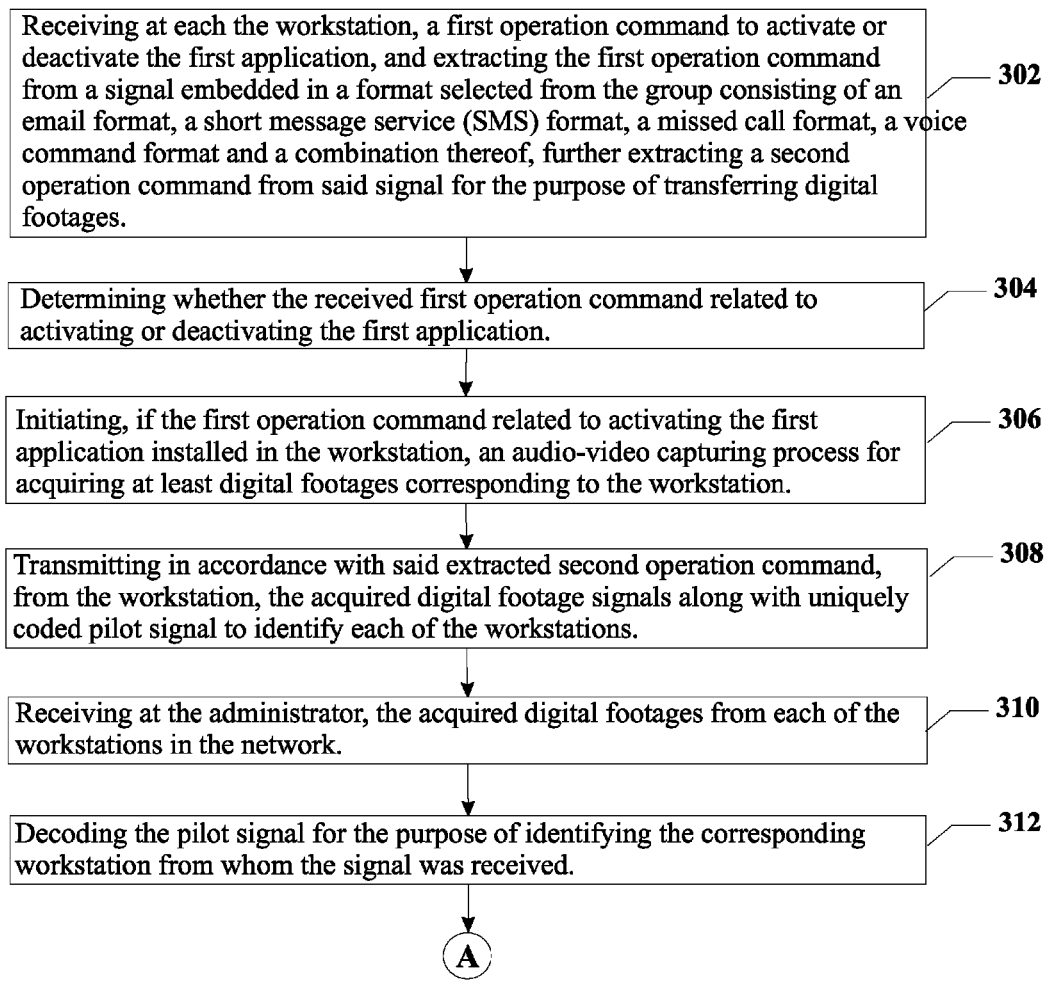
Figure 3B:
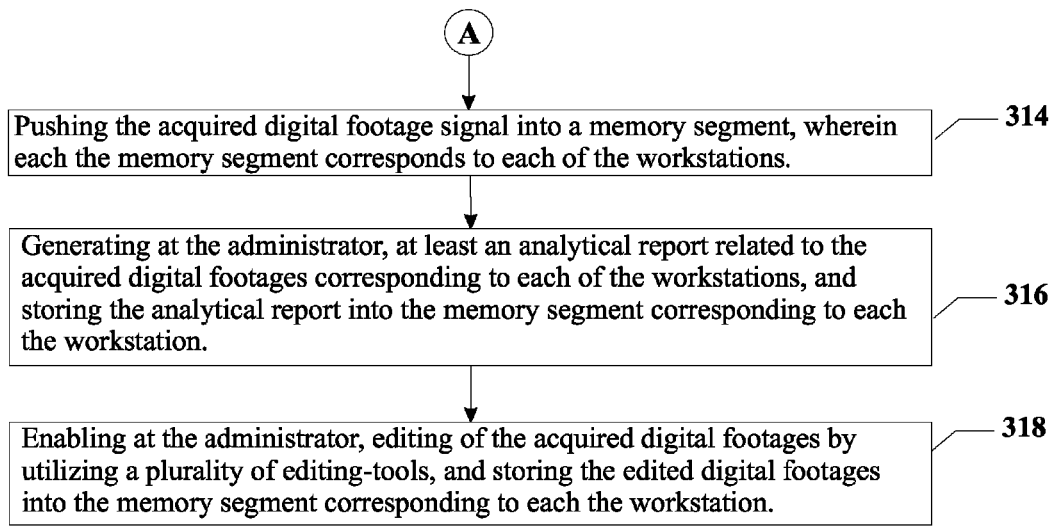

The computer implemented computer implemented non-intrusive remote monitoring and capturing system and method of the present disclosure will now be explained in relation to the non-limiting accompanying drawings, in which:

FIGS. 1(a) and 1(b) illustrates a system-level block diagram of the components of a computer implemented non-intrusive remote monitoring and capturing system, in accordance with the present disclosure;

FIG. 2 illustrates a process flow diagram of the system 100 illustrated in FIG. 1(a) and FIG. (b), in accordance with the present disclosure; and FIG. 3(a) and FIG. 3(b) illustrate a flowchart for a method of implementation implementing a non-transitory computer implemented non-intrusive remote monitoring and capturing system 100 illustrated in FIG. 1(a) and FIG. 1(b), in accordance with the present disclosure.

DETAILED DESCRIPTION

The computer implemented non-intrusive remote monitoring and capturing system and method will now be described with reference to the accompanying drawings, which do not restrict the scope and ambit of the present disclosure. The description is provided purely by the way of illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present disclosure envisages a computer implemented non-intrusive remote monitoring and capturing system and a method thereof. The system is accessible via a network. The system of the present disclosure is based on remote capturing technology. The system automated with the capturing process related to human interactions, applications installed and executed at the client's location, screen capturing and videos. The system is enabled to capture record, extracts screen images, menus, buttons, fields, and the names of controls the actions taken on controls, the underlying activity of the operating system or browser.

The users required to register themselves with the system to access the functionalities offered by the system. On registering with the system, the user is provided with a link/option to install the system at their workstation. In accordance with the present disclosure, an administrator of the system is enabled to create offline login accounts for other external-users depending upon the external-user's designated roles and hierarchy. The registration of the users on the system can be done by providing user registration information in a pre-determined user-registration form. Usually, the administrator has all the rights and decides upon whether to provide the system installation for a particular workstation.

In accordance with the present disclosure, the system is enabled to receive and store a biometric authentication entity from the user during the registration process. This biometric authentication entity is used in verifying the legitimacy of the user who wish to login into the system to start or stop the system executing at the workstation. The biometric authentication entity can be visual biometric such as ear, eyes-iris recognition, eyes-retina recognition, face recognition, fingerprint recognition, finger geometry recognition, hand geometry recognition, signature recognition; behavioral biometric such as gait, typing recognition; spatial biometric such as hand geometry recognition, finger geometry recognition; auditory biometric such as voice—speaker verification/authentication, voice—speaker identification; and vein recognition.

Referring to FIG. 1(a) and FIG. 1(b), there is shown a system-level block diagram of the components of a computer implemented non-intrusive remote monitoring and capturing system 100. The non-intrusive remote monitoring and capturing system 100, in accordance with the present disclosure is configured to group users of the system 100 into at least two user roles namely, supervisor and registered members having authorized rights. In accordance with the present disclosure, a supervisor supports system administration functions and ensures proper implementation of the non-intrusive monitoring system 100 in all the workstations in the network. The supervisor also ensures that appropriate data capturing, data sharing, and maintenance & licensing policies are implemented on the system 100. The supervisor is enabled perform functions such as gathering, editing, adding, deleting, sharing, uploading and/or updating and managing the modules and data to maintain the ethnicity of the system 100.

The non-intrusive remote monitoring and capturing system 100, in accordance with the present disclosure includes but is not limited to a first application installed in an administrator device 10 and a second application installed in a plurality of workstation (20, 30, 40, 50, 60 . . . ). The first application and the second application are accessible to each other via a network. The administrator 10 includes a third receiver 11, a memory segment 12, an analytical engine 13, an editor 14, an authentication module 15, a first timer module 16, and a first settings module 17. The workstation 20 includes a first receiver 21, an audio-video capturing device 22, and a first transmitter 23.

In accordance with the present disclosure, the supervisor is enabled to accesses the administrator 10 of the system 100. The supervisor can transmit an electronic signal to the workstation 20 to enable activation or deactivation of the system 100 executed on the workstation 20 i.e. activation or deactivation of the second application installed at the workstation. Prior to the transmission of the electronic signal to the workstation 20, the authentication module 15 establish a biometric authentication of the supervisor, who transmits the electronic signal to the initiate or stop the capturing process of the second application installed at the workstation 20. The supervisor can transmit the electronic signal to the second application installed at the workstation 20 using any mobile device capable transmitting a missed call or a short message service (sms), an email, a voice command to the workstation 20 and a combination thereof.

In accordance with the present disclosure, the first receiver 21 includes an extractor 21A, a second timer module 21B, and a second setting module 21C. Once the first receiver 21 of the workstation 20 receives the electronic signal, the first extractor 21A extracts a first operation command from the electronic signal received from the supervisor authenticated by the administrator 10. The first operation command extracted from the electronic signal which is embedded in a format selected from the consisting of an email format, a short message service (SMS) format, a missed call format, a voice command format and a combination thereof. In addition, the first extractor 21A enabled to extract a second operation command from the electronic signal. This second operation command includes information of a destination where the digital footages to be transferred by the workstation 20. In accordance with the present disclosure, the supervisor is enabled to transmit the missed call or SMS for the purpose of activation or deactivation of the second application installed at the workstation 20 using any wired or wireless communication device(s) registered with first application installed at the administrator 10. Further, the supervisor is enabled to transmit the missed call or SMS and/or email for providing network information of the destination where the digital footages to transferred. The destination can includes network information pertaining at least one of plurality of workstations (20, 30, 40, 50, 60 . . . ) and the administrator 10, as desired by the supervisor.

In accordance with the present disclosure, the second timer module 21B is enabled to receive the preset timer from the electronic signal received and the second setting module 21C is enabled to receive the settings corresponding to the digital footages to be acquired or captured such as images, audios, videos and combinations thereof. The preset timer defines the time duration of the digital footage to be acquired at the workstation 20.

In accordance with the present disclosure, the first extractor 21A further extracts the preset time and the settings along with the first operation command received at the first receiver 21. The first receiver 21 communicates the first operation command, the preset timer and the settings received from the administrator 10 to the audio-video capturing device 22. The audio-video capturing device 22 includes a first repository 22A, a second receiver 22B, an acquiring module 22C and a determinator 22D. The first repository 22A located inside the audio-video capturing device 22 stores a set of digital footage acquiring rules to facilitate the acquiring module 22C to acquire digital footages at the workstation 20. The second receiver 22B is enabled to receive the first operation command, the preset timer and the settings received from the first receiver 21. Further, the second receiver 22B communicates the first operation command to the determinator 22D which is enabled to determine the whether the first operation command relates to activating or deactivating the audio-video capturing device 22 for the purpose acquiring digital footages of the workstation 20 and vice versa. If the determinator 22D successfully determines that the first operation command relates to activating the audio-video capturing device 22, then the second receiver 22A communicates with the acquiring module 22C with trigger signal to initiate the digital footage acquiring process. In addition, the acquiring module 22C starts acquiring digital footages of the workstation 20 in accordance with the preset timer and the settings received from the second receiver 22A. Additionally, if the determinator 22D determines that the relates to deactivating the audio-video capturing device 22, then the second receiver 22A directs the acquiring module 22C with trigger signal to stop/discontinue the ongoing process of acquiring digital footages at the workstation 20.

In accordance with the present disclosure, the digital footages acquired by the acquiring module 22C, the audio-video capturing module 22 communicates the acquired digital footages to the first transmitter 23 of the workstation 20. The first transmitter 23 receives the second operation command from the first receiver 21. The second operation command indicates the first transmitter 23 about the destination where the acquired digital footages to be transferred. This destination is set by the supervisor. The first transmitter 23 transmits the acquired digital footage data packet signal either the administrator 10 or the workstations (20, 30, 40, 50, 60 . . . ), in accordance with the destination indicated in the second operation command. In an embodiment, the first transmitter 23 transmits the acquired digital footage data packet signal either to the first application installed at the administrator 10. The digital footage data packet signal includes a digital footage signal and a uniquely coded pilot signal to identify corresponding workstation 20. The third receiver 11 configured in the administrator 10 is enabled to receive the digital footage data packet signal comprising the digital footage signal and the pilot signal. The third receiver 11 includes an identifier 11A and a push module 11B. The identifier 11A is enabled to identify from which workstations (20, 30, 40, 50, 60 . . . ) by decoding the pilot signal present in the digital footage data packet signal received from the corresponding workstation. Further, after the identifier 11A has identified the workstation 20, the identifier 11A communicates the identified information to the push module 11B. The push module 11B pushes the digital footage signal present in the digital footage data packet signal to the appropriate memory segment 12 associated with the workstation 20. A plurality of memory segments 12 is configured into the administrator 10. Each of the memory segments 12 corresponds to a particular workstation (20, 30, 40, 50, 60 . . . ) within the network. Alternatively, the administrator 10 can be configured to be connected with a remotely located database (not shown in the figures) to securely store the data related to the workstations (20, 30, 40, 50, 60 . . . ) The remotely located database can be provided with high level of security for example, by providing multi factor authentication for the purpose of accessing information from the remotely located database. In accordance with the present disclosure, there is provided the analytical engine 13 configured in the administrator 10 by means of the first application. The analytical engine 12 communicates with the memory segments 12 for the purpose of retrieving the desired information related to the digital footages acquired by the plurality of workstations (20, 30, 40, 50, 60 . . . ) from the corresponding memory segment 12. A fourth receiver 12A associated with the memory segments 12 receives the request from the analytical engine 13 and communicates the request to a second extractor 12B associated with the memory segments 12. The second extractor 12B extracts the desired information relating to the digital footages stored into the memory segment 12. The desired information can include images videos, audios, or a combination thereof from the stored digital footages. The second transmitter 12C associated with the memory segment 12 communicates with the second extractor 12B to receive the extracted information stored in the memory segments 12 corresponding to the workstations 20. Further, the second transmitter 12C is enabled to transmit the extracted desired information relating to the digital footages to the analytical engine 13 as requested. The analytical engine 13 includes a third repository 13A and a first document exporter 13B. The third repository 12A stores the analytical rules to be utilized by the analytical engine 13 for the purpose of generating analytical reports corresponding to the extracted information retrieved from the remotely located second repository. The analytical engine 13 further enabled to transmit the analytical reports generated to the memory segment 12 for the purpose of storing the analytical reports generated with the corresponding digital footages stored in the segments 12. Alternatively, the first application based on the preferences set by the supervisor accessing the administrator 10, the analytical engine 13 can store the analytical reports into the remotely located database. In addition, the first document exporter 13B of the analytical engine 13 is enabled to export the analytical reports generated into a format selected from the group consisting of a word document format, a power point presentation format, an excel sheet format, a portable document format, an image format, an audio format, a video format and a combination thereof.

In accordance with the present disclosure, the analytical engine 13 can be accessed and operated by the supervisor. Further, the supervisor can set/reset the configuration of the analytical engine 13 for the purpose of generating and storing analytical reports either manual or automatic. The supervisor is also enabled to set/rest the settings of the first document exporter 13B in which format the analytical reports are to be exported and stored into the memory segment 12. Additionally, the supervisor is further enabled to set/reset a regular time interval for the automatic generation of analytical reports at the administrator 10.

In accordance with the present disclosure, the first application installed at the administrator 10 includes the editor 14. The editor 14 is configured into the processor of the administrator 10 by means of the first application. The editor 14 can be accessed or operated by the supervisor. The editor communicates with the memory segment 12 for the purpose of retrieving the desired information related to the digital footages stored. The retrieved information can be edited by using a plurality of editing-tools 14A present in the editor. The supervisor editing the retrieved information relating to the digital footages is further facilitated to export the edited information using a second document exporter 14B into a format selected from the group consisting of a word document format, a power point presentation format, an excel sheet format, a portable document format, an image format, an audio format, a video format and a combination thereof.

The edited information exported can be stored back into the memory segment 12 corresponding to the original digital footages. Alternatively, the first application based on the preferences set by the supervisor accessing the administrator 10, the editor 14 can store the edited digital footages into the remotely located database. The editor 14 is provided with the editing-tools 14A which includes a set of tools for editing an image, a set of tools for editing text, a set of tools for editing audio and a set of tools for editing a video. The supervisor is enabled to do tasks such as dubbing, labeling, marking, annotating, tagging, morphing, merging, inserting and combination thereof using the plurality of editing-tools 14A available with the editor 14.

In accordance with the present disclosure, the exported analytical reports and exported edited digital footages can be retrieved or accessed by the supervisor stored in the memory segment 12 or the remotely located database for the purpose of imparting training to other users. The supervisor also enabled to share the exported analytical reports and the exported edited digital footage documents with any workstations (20, 30, 40, 50, 60 . . . ) within the network.

Further, the memory segments 12 stores information related to the supervisor and the authorized users, biometric authentication details corresponding to the supervisors and authorized users, workstation information, originally acquired digital footage corresponding to each said workstation, edited digital footages corresponding to each said workstation, analytical reports generated, and digital footage capturing log files. Alternatively, the supervisor can configure the settings of the first application installed in the administrator 10 in manner to store the aforementioned information into the remotely located database with a high level security.

In accordance with the present disclosure, the first application installed in the administrator 10 is provided with the first timer module 16 and the first setting module 17. The first timer module 16 can store and receive commands related to set/reset the preset timer. The supervisor is enabled to set/reset the preset timer who is authorized to access the administrator 10. The preset timer transmitted along with the electronic signal to the workstations (20, 30, 40, 50, 60 . . . ) The preset timer defines the time duration of the digital footage to be acquired at the workstation 20. The supervisor can change the preset timer corresponding to each workstation (20, 30, 40, 50, 60 . . . ) within the network. Further, the supervisor is enabled to set/reset the preset timer is manner to enable acquiring of digital footages at the workstation 20 in regular intervals. Additionally, the first timer module 16 is further enabled to retrieve the previously set preset timer from the memory segment 12 corresponding to the workstation 20.

In accordance with the present disclosure, the first setting module 17 can receive and store commands related to set/reset a plurality of setting-tools available with the first setting module 17. The supervisor is enabled to set/reset the setting configurations using the setting-tools, or a person who is authorized to access the administrator 10. The setting configurations are transmitted along with the electronic signal to the workstations (20, 30, 40, 50, 60 . . . ) The supervisor can utilize the setting-tools to configure the setting related to images, audios, videos corresponding to the digital footages to be acquired at each workstation (20, 30, 40, 50, 60 . . . ) in the network. Additionally, the first setting module 17 is further enabled to retrieve the previously set settings/configurations data from the memory segment 12 corresponding to the workstation 20.

In accordance with the present disclosure, the supervisor authorized to access the administrator 10, is provided with the facility to manage the records stored in the memory segments 12 and the remotely located database if connected or configured with the administrator 10. The remotely located database can be configured to be connected or disconnected with the second application installed in the administrator 10 as and when required.

Referring to FIG. 2, illustrating a process flow diagram of the system 100 illustrated in FIG. 1, in accordance with the present disclosure. The system 100 is enabled to record/extracts screen images, menus, buttons, fields, and the names of controls the actions taken on controls, the underlying activity of the operating system or browser. The process flow diagram includes the following steps:

creating a new project on the system 100 running/executing on the targeted workstation, 202;
selecting the capture region 204;
selecting the capture mode 206;
setting/changing user preferences (optional step) 208;
recording/capturing digital footage as per the set user preferences or default preferences 210;
if the digital footage capture is a collection of images, editing the images or screenshots captured as digital footages in the project created 212; this includes the following sub steps:
   opening an existing project 212A;
   editing the images or the screenshots with the image sub-editor 212B;
   exporting images to documents in the format selected from the group consisting of word document, power point presentation, portable document format, videos format 212C;
   merging/compiling two or more projects created on the system 100 as a single document or project 212D
if the digital footage capture is a video(s), editing the videos captured as digital footages in the project created 214; this includes the following sub steps:
   opening an existing project 214A;
   merging the videos 214B;
   importing an audio(s) 214C;
   redubbing the audio 214D;
   importing power point presentations 214E; and
   converting into videos using a video converter 214F.

In accordance with present disclosure, the authorized user or the administrator has the rights to configure or customize the corresponding entities of the digital footages to be captured are mentioned below:

image quality customization mode—this enables the authorized user to customize the quality of the image for the capturing digital footages at the targeted workstation. The quality of the image can vary from 1% to 100%. Further, the file size of the image is directly proportional to the image quality. If the image quality is increased then the file size of the image in increased and vice versa. The default value for the image quality customize mode is set to 60%, this can be set/reset by the authorized user.

video output customization mode—the video output can be selected from the available list of formats such as MPEG-1, MPEG-2, MPEG-3, MPEG-4, MP4, WMV, FLR, FLA, FLV, DAT, AVI, ASF, SOL, AVCHD, CAM, M4V, SVI, MNG, GIF, WRAP. The video format WMV is selected as default video format for the user has installed the Microsoft Encoder 4 free version, further the authorized user can select any other format from the aforementioned format as per the need. The MP4 is selected as the default video format for the user who has purchased and installed the Microsoft Encoder 4 pro with codecs.

image resolution customization mode—image resolution is the size (width×height) of the image on screen. There are three types of image resolution will be available to user to choose from a drop down menu. The default resolution type selected is 1024×768, the user is enabled to select any of the available resolution types as per the requirement.

show hyperlink addresses customization option—while capturing the digital footages or user activities on a web browser. If the hyperlink option is checked, then this option decides whether to capture the URL/address of the hyperlinks along with the hyperlink name of the webpages opened in the web browser along with the step description.

capture mouse customization option—the authorized user can either check/uncheck this option. If this option is checked the system 100 is enabled to capture the mouse operations in the digital footages while capturing other user activities.

highlight color customization option—by selecting this option, the authorized user is enabled to change the color of the rectangle used for highlighting specific area in the captured digital footage. This done by clicking on the mouse pointer during the digital footage capturing process.

video and audio bit rate customization option—this option enables the authorized user to the capture video quality and size. However, by selecting the maximum value for this option will increase the file size and quality.

split video customization option—this enables the authorized user to set the upper limit for the running length of the video to be captured in the digital footage. Once the preference is set by the user and capturing process begins, as soon as the upper limit for running length of the video is reached, the system 100 automatically splits the captured video and creates a new video file to continue with the capturing process. The minimum time which can be set for split video customization option is 1 minute and maximum can be 999 minutes. This subject to disk space availability.

assign hot keys customization option—the authorized user can assign the hot keys according to his/her convenience to Start/Pause/Resume/Stop the system 100 that is execution mode. Once hot the keys are configured the same can be used by the user to control the Start/Pause/Resume capturing and Stop capturing of the project. The default hot keys for Start/Pause/Resume are Ctrl+F7 and for Stop are Ctrl+F8.

In accordance with present disclosure, once the authorized user has set his/her aforementioned customization settings he/she can click the save these settings for the purpose of capturing digital footages. The authorized user is privileged to reset the customized settings as per the requirement. The user is enabled to mute/unmute audio to be captured in the digital footage. Based on the audio settings i.e. audio muted/unmuted the output digital footage containing video will have captured audio or the video alone.

In accordance with present disclosure, the authorized user is enabled to export the digital footages acquired into a word document format, power point presentation format, video format, audio format, portable document format (PDF), an image format and a combination thereof.

Referring to FIG. 3(a) and FIG. 3(b), a method for implementing a computer implemented non-intrusive remote monitoring and capturing system 100 for remotely monitoring operations on a plurality of workstations from an administrator accessible via a network illustrated in FIG. 1(a) and FIG. 1(b). The method includes the step of installing a first application in the administrator and the step of installing a second application in each of the workstations. The method envisaged by the present disclosure includes the following steps:
- receiving at each the workstation, a first operation command to activate or deactivate the first application, and extracting the first operation command from a signal embedded in a format selected from the group consisting of an email format, a short message service (SMS) format, a missed call format, a voice command format and a combination thereof, further extracting a second operation command from the signal for the purpose of transferring digital footages; 302;
- determining whether the received first operation command related to activating or deactivating the first application 304;
- initiating, if the first operation command related to activating the first application installed in the workstation, an audio-video capturing process for acquiring at least digital footages corresponding to the workstation 306;
- transmitting in accordance with the extracted second operation command, from the workstation, the acquired digital footage signals along with uniquely coded pilot signal to identify each of the workstations 308;
- receiving at the administrator, the acquired digital footages from each of the workstations in the network 310;
- decoding the pilot signal for the purpose of identifying the corresponding workstation from whom the signal was received 312;
- pushing the acquired digital footage signal into a memory segment, wherein each the memory segment corresponds to each of the workstations 314;
- generating at the administrator, at least an analytical report related to the acquired digital footages corresponding to each of the workstations, and storing the analytical report into the memory segment corresponding to each the workstation 316; and
- enabling at the administrator, editing of the acquired digital footages by utilizing a plurality of editing-tools, and storing the edited digital footages into the memory segment corresponding to each the workstation 318.

In accordance with the present disclosure, the extracted second operation command for the purpose of transferring digital footages from the workstation includes network information of a destination where the acquired digital footages to be transferred, wherein the destination is selected from the group consisting at least one of the administrator and the workstation.

In accordance with the present disclosure, the method includes the step of authenticating at the administrator, by utilizing a biometric authentication technique to authenticate the operation command to activate and/or deactivate the first application installed in each of the workstations.

In accordance with the present disclosure, the step of receiving at least a computer command further includes the step of determining whether the received computer command relates to activate or deactivate the second application installed in the workstations, further includes the following steps:
- if activate, initiating an activation process for capturing digital footages; and
- if deactivate, initiating a deactivation process for currently capturing digital footages;
- wherein the step of receiving at least computer command from the supervisor accessing the first application installed at the administrator selected from the group consisting of an email, a short message service (sms), a missed call, a reminder and combination thereof.

In accordance with the present disclosure, the step of receiving at each the workstation an operation command to activate or deactivate the first application further includes the following steps:
- receiving a preset timer determining the time duration of the digital footage to be acquired corresponding to the workstation; and
- receiving at least settings corresponding images, audio, videos to be acquired in the digital footages corresponding to the workstation.

In accordance with the present disclosure, the step of generating analytical reports further includes the step of exporting the analytical reports in a format selected from the group consisting of a word document format, a power point presentation format, an image format, an audio format, a video format, a portable document format, an excel sheet format and a combination thereof.

In accordance with the present disclosure, the non-intrusive monitoring system keeps records of the user's activities at his/her workstation by capturing the video of the user showing user interaction with others fellow users and the duration of his/her productive time. In addition, the system is enabled to capture the user's on screen activities which further streamlines the user's productive time duration. The knowledge of the non-intrusive monitoring system configured at the user's workstation and can keep the user focused towards his work and further enabled to increase the work productivity of the user.

TECHNICAL ADVANCEMENTS

The technical advancements of the computer implemented non-intrusive remote monitoring and capturing system and method as envisaged by the present disclosure include the realization of:
- a computer implemented system for the purpose of non-intrusive monitoring;
- a system that can be triggered by a missed call, email, short messaging service (SMS), and a voice command;
- a system that increases the work productivity of a user;
- a system that provides comprehensive reports based on the digital footages captured;
- a system that is enabled to capture activities performed by a user at his/her respective workstation;
- a system with video recognition capabilities;
- a system that facilitates users with multi-media editing functionalities;
- a system that enables the user to customizable automation of repeated task;
- a system that reduces manual efforts for creating training documentation;
- a system that can be managed with minimum administration;
- a system that can produce documentation to be utilized for the training purpose; and
- a system that is user friendly.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented non-intrusive remote monitoring and capturing system for remotely monitoring operations on a plurality of workstations from an administrator, said system comprising a first application installed in each of the workstations and a second application installed in said administrator, said first application and said second application being accessible to each other via a network, said system comprising:

first receivers configured in each of said workstations, said first receivers adapted to activate or deactivate said first application, a first extractor in said first receiver adapted to extract a first operation command from a signal embedded in a format selected from the group consisting of an email format, a short message service (SMS) format, a missed call format, a voice command format and a combination thereof; said first extractor of said first receiver further adapted to extract a second operation command from said signal for the purpose of transferring digital footages;

audio-video capturing devices associated with the workstations, said audio-video capturing device in communication with said first receiver, said audio-video capturing device having a set of digital footage acquiring rules stored in a first repository, said audio-video capturing device comprising:
 a second receiver adapted to receive the first operation command from the first receiver to activate or deactivate said audio-video capturing device;
 an acquiring module in communication with said second receiver, said acquiring module configured to acquire digital footages corresponding to the workstation associated with said audio-video capturing device;

first transmitters configured in each of said workstations, said first transmitter in communication with said audio-video capturing device, said first transmitter in communication with the first receiver to receive the extracted second operation command, said first transmitter adapted to transmit the acquired digital footage signals along with a uniquely coded pilot signal to identify each of said workstations;

a third receiver configured in said administrator, said third receiver adapted to receive the digital footage signal along with the pilot signal from said workstation, said third receiver adapted to decode the pilot signal to identify said corresponding workstation, further said third receiver adapted to push the digital footage signal into an appropriate memory segment corresponding to said workstation;

an analytical engine configured in a processor of said administrator by means of the second application, said analytical engine having a third repository for storing analyzing rules, said analytical engine configured to access said memory segments storing the digital footage signals and further adapted to extract the digital footages from the signals, said analytical engine adapted to generate analytical reports related to the acquired digital footages corresponding to each of said workstations, said analytical engine further configured to store the analytical reports corresponding to each of said workstations into said memory segments; and an editor configured in said processor of said administrator by means of the second application, said editor having a plurality of editing-tools and corresponding editing rules stored in a fourth repository, said editor configured to access said memory segments storing the digital footage signals and further adapted to extract the digital footages from the signals, said editor adapted to facilitate utilization of the editing-tools for the purpose of editing the acquired digital footages using the editing-tools, further said editor configured to store the edited digital footage related to the originally acquired digital footage corresponding to each of said workstations into said memory segments.

2. The system as claimed in claim 1, wherein the second operation command extracted by said first extractor of said first receiver includes network information of a destination where the acquired digital footages to be transferred by the first transmitter, wherein said destination is selected from the group consisting at least one of said administrator and said workstation.

3. The system as claimed in claim 1, wherein said audio-video capturing devices configured in each said workstation further comprises a determinator in communication with the second receiver, said determinator adapted to determine whether the first operation command related to activate the audio-video capturing device for capturing digital footage or to deactivate the existing digital footage acquiring process.

4. The system as claimed in claim 1, wherein said system comprises:
 an authentication module configured in said administrator, said authentication module adapted to establish a biometric authentication of the user to activate and/or deactivate each of said workstation;
 a first timer module configured in said administrator, said first timer module adapted to receive and store commands to set and/or reset a preset timer corresponding to each said workstations, the first timer module configured to retrieve the previously set preset timer configuration from said segment corresponding to each said workstations stored into said remotely located database; and
 a first setting module configured in said administrator, said first setting module adapted to receive and store commands to set and/or reset at least a setting-tool corresponding to images, audios and videos corresponding to each said workstations.

5. The system as claimed in claim 4, wherein said first receivers configured in each of said workstations, said first receiver includes:
 a second timer module adapted to receive and extract the preset timer from the signal received by the first receiver, wherein the preset timer defines the time duration of the digital footage to be acquired at said corresponding workstation; and a second setting module adapted to receive and extract the settings related to the digital footages to be acquired corresponding to images, audios, videos and combination thereof corresponding to said workstation.

6. The system as claimed in claim 4, wherein said first transmitters configured in each of said workstations, said first transmitters adapted to transmit acquired digital footages to said administrator in accordance with the preset timer.

7. The system as claimed in claim 1, wherein analytical engine further includes a document exporter configured to export the analytical reports in a format selected from the group consisting of a word document format, a power point presentation format, an excel sheet format, a portable document format, an image format, an audio format, a video format and a combination thereof.

8. The system as claimed in claim 1, wherein said editing-tools are selected from the group consisting of a dubbing tool, a labeling tool, a marking tool, an annotating tool, a tagging tool, a morphing tool, a merging tool, an inserting and a combination thereof.

9. The system as claimed in claim 1, wherein said memory segments are further configured to store information related to the user, biometric authentication details corresponding to the user, workstation information, originally acquired digital footage corresponding to each said workstation, edited digital footages corresponding to each said workstation, reports generated, and digital footage capturing log files.

10. A computer implemented method for purpose of implementing a non-intrusive remote monitoring and capturing system for remotely monitoring operations on a plurality of workstations from an administrator accessible via a network, said method includes the step of installing a first application in each of said workstations and the step of installing a second application in said administrator, wherein said first application and said second application being accessible to each other via a network said method comprising:
 receiving at each said workstation, a first operation command to activate or deactivate said first application, and extracting the first operation command from a signal embedded in a format selected from the group consisting of an email format, a short message service (SMS) format, a missed call format, a voice command format and a combination thereof, further extracting a second operation command from said signal for the purpose of transferring digital footages;
 determining whether said received first operation command related to activating or deactivating said first application;
 initiating, if the first operation command related to activating said first application installed in said workstation, an audio-video capturing process for acquiring at least digital footages corresponding to said workstation;
 transmitting in accordance with said extracted second operation command, from said workstation, said acquired digital footage signals along with uniquely coded pilot signal to identify each of said workstations;
 receiving at said administrator, said acquired digital footages from each of said workstations in the network;
 decoding the pilot signal for the purpose of identifying said corresponding workstation from whom the signal was received;
 pushing said acquired digital footage signal into a memory segment, wherein each said memory segment corresponds to each of said workstations;
 generating at said administrator, at least an analytical report related to said acquired digital footages corresponding to each of said workstations, and storing said analytical report into said memory segment corresponding to each said workstation; and
 enabling at said administrator, editing of said acquired digital footages by utilizing a plurality of editing-tools, and storing said edited digital footages into said memory segment corresponding to each said workstation.

11. The method as claimed in claim 10, wherein said extracted second operation command for the purpose of transferring digital footages from said workstation includes network information of a destination where the acquired digital footages to be transferred, wherein said destination is selected from the group consisting at least one of said administrator and said workstation.

12. The method as claimed in claim 10, wherein said method further includes the step of authenticating at said administrator, by utilizing a biometric authentication technique to authenticate said first operation command to activate and/or deactivate said first application installed in each of said workstations.

13. The method as claimed in claim 10, wherein the step of receiving at each said workstation a first operation command to activate or deactivate said first application further includes the following steps:
 receiving a preset timer determining the time duration of the digital footage to be acquired corresponding to said workstation; and
 receiving at least setting corresponding to images, audios, videos to be acquired in the digital footages corresponding to said workstation.

14. The method as claimed in claim 10, wherein the step of generating analytical reports further includes the step of exporting the analytical reports in a format selected from the group consisting of a document format, a presentation format, an excel sheet format, an image format, an audio format, a video format and a combination thereof.

* * * * *